US008562421B2

(12) United States Patent
Chim

(10) Patent No.: US 8,562,421 B2
(45) Date of Patent: Oct. 22, 2013

(54) METHOD OF GAMING, A GAME CONTROLLER, A GAMING DEVICE AND A GAMING SYSTEM

(75) Inventor: Chi We Chim, Castle Hill (AU)

(73) Assignee: Aristocrat Technologies Australia Pty Limited (AU)

(*) Notice: Subject to any disclaimer, the term of this patent is extended or adjusted under 35 U.S.C. 154(b) by 808 days.

(21) Appl. No.: 12/340,682

(22) Filed: Dec. 20, 2008

(65) Prior Publication Data

US 2010/0160036 A1 Jun. 24, 2010

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/21; 463/10; 463/16; 463/25; 463/26; 463/27

(58) Field of Classification Search
USPC .................................. 463/10, 16, 21, 25–27
See application file for complete search history.

(56) References Cited

U.S. PATENT DOCUMENTS

| | | | | |
|---|---|---|---|---|
| 5,078,405 | A * | 1/1992 | Jones et al. | 463/27 |
| 5,417,430 | A * | 5/1995 | Breeding | 273/292 |
| 7,458,889 | B2 * | 12/2008 | Gauselmann | 463/16 |
| 2001/0004607 | A1 * | 6/2001 | Olsen | 463/26 |
| 2003/0228899 | A1 * | 12/2003 | Evans | 463/25 |
| 2004/0009808 | A1 * | 1/2004 | Gauselmann | 463/25 |
| 2006/0058088 | A1 * | 3/2006 | Crawford et al. | 463/13 |
| 2006/0094507 | A1 * | 5/2006 | Iwamoto | 463/42 |
| 2007/0060254 | A1 * | 3/2007 | Muir | 463/16 |
| 2007/0218975 | A1 * | 9/2007 | Iddings et al. | 463/25 |
| 2007/0218982 | A1 * | 9/2007 | Baerlocher | 463/27 |

FOREIGN PATENT DOCUMENTS

WO WO 2008/054681 * 5/2008

* cited by examiner

*Primary Examiner* — Fernando L Toledo
*Assistant Examiner* — Karen Kusumakar
(74) *Attorney, Agent, or Firm* — McAndrews, Held & Malloy, Ltd.

(57) ABSTRACT

A method of gaming comprising: conducting a mystery jackpot and a progressive jackpot having, respectively, a mystery jackpot pool and a progressive jackpot pool to which contributions are made in response to game play on participating gaming devices; making a contribution to the mystery jackpot pool in response to each play of a game with one of the participating gaming devices; and making at least one contribution to the progressive jackpot pool in response to each play of a game with one of the participating gaming devices in which an ante bet is made on the game.

30 Claims, 6 Drawing Sheets

METHOD OF GAMING, A GAME CONTROLLER, A GAMING DEVICE AND A GAMING SYSTEM

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention generally relates to a method of gaming, a game controller, a gaming device and a gaming system.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player can start to quickly play the game and therefore extract maximum entertainment from the game.

Progressive jackpots may be offered on gaming machines. A progressive controller may be programmed to accumulate a percentage of the turnover bet on the machine, that percentage being accumulated in a progressive pool. On the occurrence of a predetermined event, the amount of money in the pool may be awarded to a player.

Recently progressive jackpot gaming systems have been implemented which operate across a group of linked gaming machines, accumulating a percentage of turnover bet on all of the linked machines into one or more progressive pools. Again the contents of a particular progressive pool may be awarded to a player when certain trigger conditions are met.

While the modified player progressive systems have increased player interest, there is still a need for further gaming systems.

BRIEF SUMMARY OF THE INVENTION

In a first aspect, the invention provides a method of gaming comprising:

conducting a mystery jackpot and a progressive jackpot having, respectively, a mystery jackpot pool and a progressive jackpot pool to which contributions are made in response to game play on participating gaming devices;

making a contribution to the mystery jackpot pool in response to each play of a game with one of the participating gaming devices; and making at least one contribution to the progressive jackpot pool in response to each play of a game with one of the participating gaming devices in which an ante bet is made on the game.

In an embodiment, the method comprises making more than one contribution to the progressive jackpot pool in response to at least one game outcome during play of a game with ante bet.

In an embodiment, there are a plurality of sub-pools of the progressive jackpot pool, and the method comprises making at least one contribution to each sub-pool.

In an embodiment, the method comprises making a contribution to a specific sub-pool in response to the at least one game outcome.

In an embodiment, the method comprises predefining the participating gaming devices.

In an embodiment, the method comprises determining the participating gaming devices in accordance with at least one criteria.

In an embodiment, at least one criteria is that a gaming devices offers a designated game.

In an embodiment, the method comprises determining for each play of a game whether to award the mystery jackpot.

In an embodiment, the method comprises determining for each play of a game in which an ante bet is made whether to award a prize from the progressive pool.

In an embodiment, the method comprises determining whether to award a prize from the progressive pool includes determining whether to award a feature game.

In an embodiment, the method comprises determining during the feature game whether to award one of a plurality of second level feature games and awarding the prize from the progressive pool upon the occurrence of respective ones of winning game outcomes of the plurality of second level feature games.

In a second aspect, the invention provides a gaming device arranged to enable a player to participate in a mystery jackpot and a progressive jackpot having, respectively, a mystery jackpot pool and a progressive jackpot pool comprising:

a display for displaying game outcomes to a player; and a game play mechanism operable by the player to initiate a play of the game, the game play mechanism arranged such that the player can select whether or not to include an ante bet in a wager on the play of the game, the gaming device further arranged to cause a contribution to be made to the mystery jackpot pool in response to each play of a game, and cause at least one contribution to be made to the progressive jackpot pool in response to each play of a game in which the ante bet is made on the game.

In an embodiment, the gaming device is arranged to cause more than one contribution to the progressive jackpot pool in response to at least one game outcome during play of a game with ante bet.

In an embodiment, there are a plurality of sub-pools of the progressive jackpot pool, and the gaming device causes at least one contribution to be made to each sub-pool.

In an embodiment, the gaming device is arranged to cause a contribution to be made to a specific sub-pool in response to the at least one game outcome.

In an embodiment, the gaming device is arranged to determine for each play of a game whether to award the mystery jackpot.

In an embodiment, the gaming device is arranged to determine for each play of a game in which an ante bet is made whether to award a prize from the progressive pool.

In an embodiment, the gaming device is arranged to determine whether to award a prize from the progressive pool by determining whether to award a feature game.

In an embodiment, the gaming device is arranged to:

determine during the feature game whether to award one of a plurality of second level feature games; and award the prize from the progressive pool upon the occurrence of respective ones of winning game outcomes of the plurality of second level feature games.

In an embodiment, the gaming device comprises a memory storing program code and a processor arranged to execute the program code to implement the game and cause the contributions to be made.

In a third aspect, the invention provides a game controller for a gaming device, the game controller arranged to enable a player to participate in a mystery jackpot and a progressive jackpot having, respectively, a mystery jackpot pool, the game controller arranged to receive an instruction initiating play of a game and to receive a wager on the play of the game which may or may not include an ante bet component, the game controller further arranged to cause a contribution to the mystery jackpot pool in response to each play of a game; and cause at least one contribution to the progressive jackpot pool in response to each play of a game in which the ante bet is made on the game.

In an embodiment, the gaming device is arranged to cause more than one contribution to the progressive jackpot pool in response to at least one game outcome during play of a game with ante bet.

In an embodiment, there are a plurality of sub-pools of the progressive jackpot pool, and the game controller causes at least one contribution to be made to each sub-pool.

In an embodiment, the gaming device is arranged to cause a contribution to be made to a specific sub-pool in response to the at least one game outcome.

In an embodiment, the gaming device is arranged to determine for each play of a game whether to award the mystery jackpot.

In an embodiment, the gaming device is arranged to determine for each play of a game in which an ante bet is made whether to award a prize from the progressive pool In an embodiment, the gaming device is arranged to determine whether to award a prize from the progressive pool by determining whether to award a feature game.

In an embodiment, the gaming device is arranged to:

determine during the feature game whether to award one of a plurality of second level feature games; and award the prize from the progressive pool upon the occurrence of respective ones of winning game outcomes of the plurality of second level feature games.

In an embodiment, the gaming device comprises a memory storing program code and a processor arranged to execute the program code to implement the game and cause the contributions to be made.

In a fourth aspect, the invention provides a gaming system comprising:

at least one jackpot controller arranged to conducting a mystery jackpot and a progressive jackpot having, respectively, a mystery jackpot pool and a progressive jackpot pool; and a plurality of gaming devices in data communication with the at least one jackpot controller, and wherein the at least one jackpot controller is arranged to make a contribution to the mystery jackpot pool in response to each play of a game with one of the gaming devices, and the at least one jackpot controller is arranged to make at least one contribution to the progressive jackpot pool in response to each play of a game with one of the gaming devices in which an ante bet is made on the game.

In an embodiment, the jackpot controller makes more than one contribution to the progressive jackpot pool in response to at least one game outcome during play of a game with ante bet.

In an embodiment, there are a plurality of sub-pools of the progressive jackpot pool, and the jackpot controller makes at least one contribution to each sub-pool for each play of a game.

In an embodiment, the jackpot controller makes a contribution to a specific sub-pool in response to the at least one game outcome.

In an embodiment, each gaming device determines for each play of a game whether to award the mystery jackpot.

In an embodiment, each gaming device determines for each play of a game in which an ante bet is made whether to award a prize from the progressive pool.

In an embodiment, determining whether to award a prize from the progressive pool includes determining whether to award a feature game.

In an embodiment, the gaming system is arranged to determine during the feature game whether to award one of a plurality of second level feature games and awarding the prize from the progressive pool upon the occurrence of respective ones of winning game outcomes of the plurality of second level feature games.

In an embodiment, each gaming device is arranged to carry out the feature games.

In an embodiment, the gaming system comprises a feature controller arranged to carry out at least one of the feature games.

In an embodiment, the gaming system comprises separate jackpot controllers for the mystery and progressive jackpots.

In a fifth aspect, the invention provides computer program code which when executed by a processor implements the above method.

In a sixth aspect, the invention provides computer program code which when executed by a processor implements the above game controller.

In a seventh aspect, the invention provides a computer readable medium comprising the above computer program code.

In an eighth aspect, the invention provides a data signal comprising the above computer program code.

In a ninth aspect, the invention extends to transmitting the computer program code.

Further aspects of the present invention will become apparent from the following description, given by way of example only and with reference to the accompanying drawings.

DETAILED DESCRIPTION OF THE INVENTION

Figure 1:
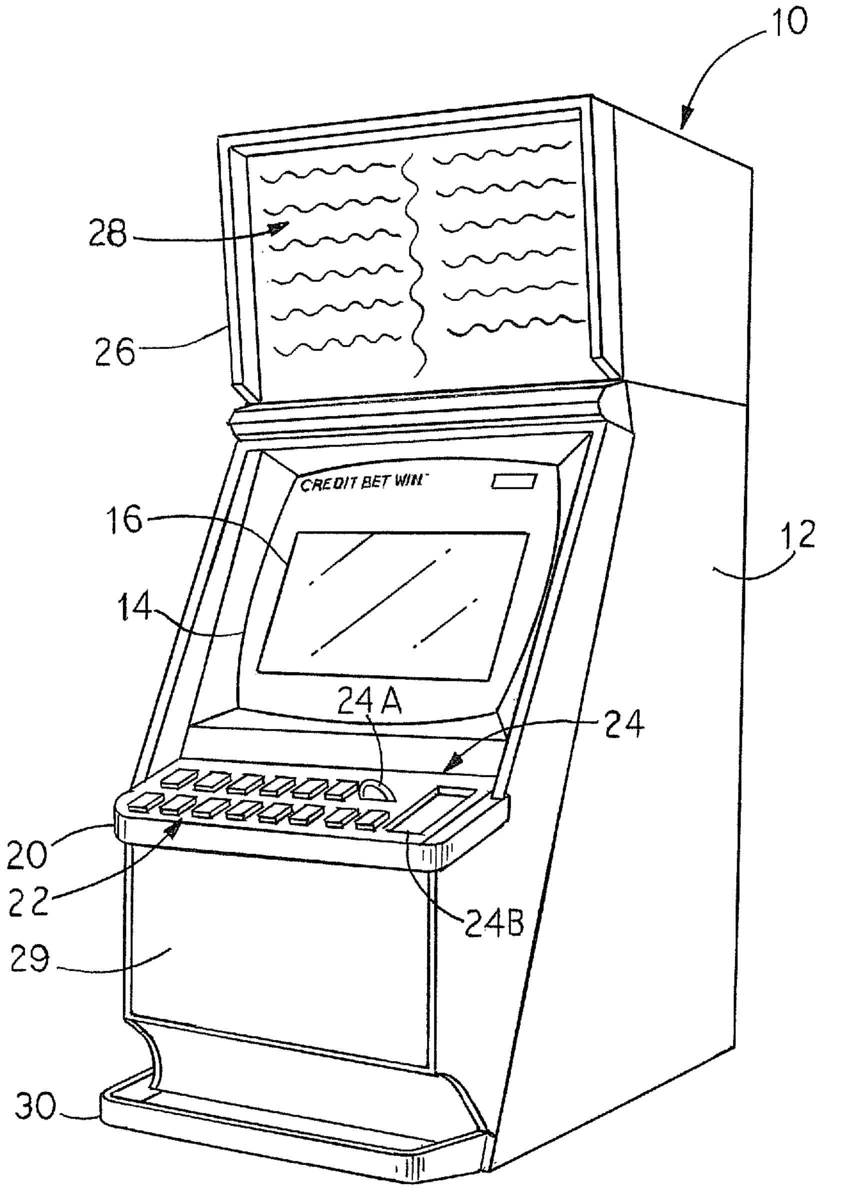
FIG. 1 shows diagrammatically, a view of a gaming machine suitable for implementing the present invention.

The embodiments provide a method of gaming, a gaming device, a gaming system, and a game controller where a player can win either a mystery or progressive jackpot and an ante bet is required for eligibility for the In FIG. 1 of the accompanying drawings, one example of a gaming machine suitable for implementing the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. In advantageous embodiments, the top box 26 may include a display, for example a video display unit, which may be of the same type as the display 14, or a different type of display.

Figure 2:
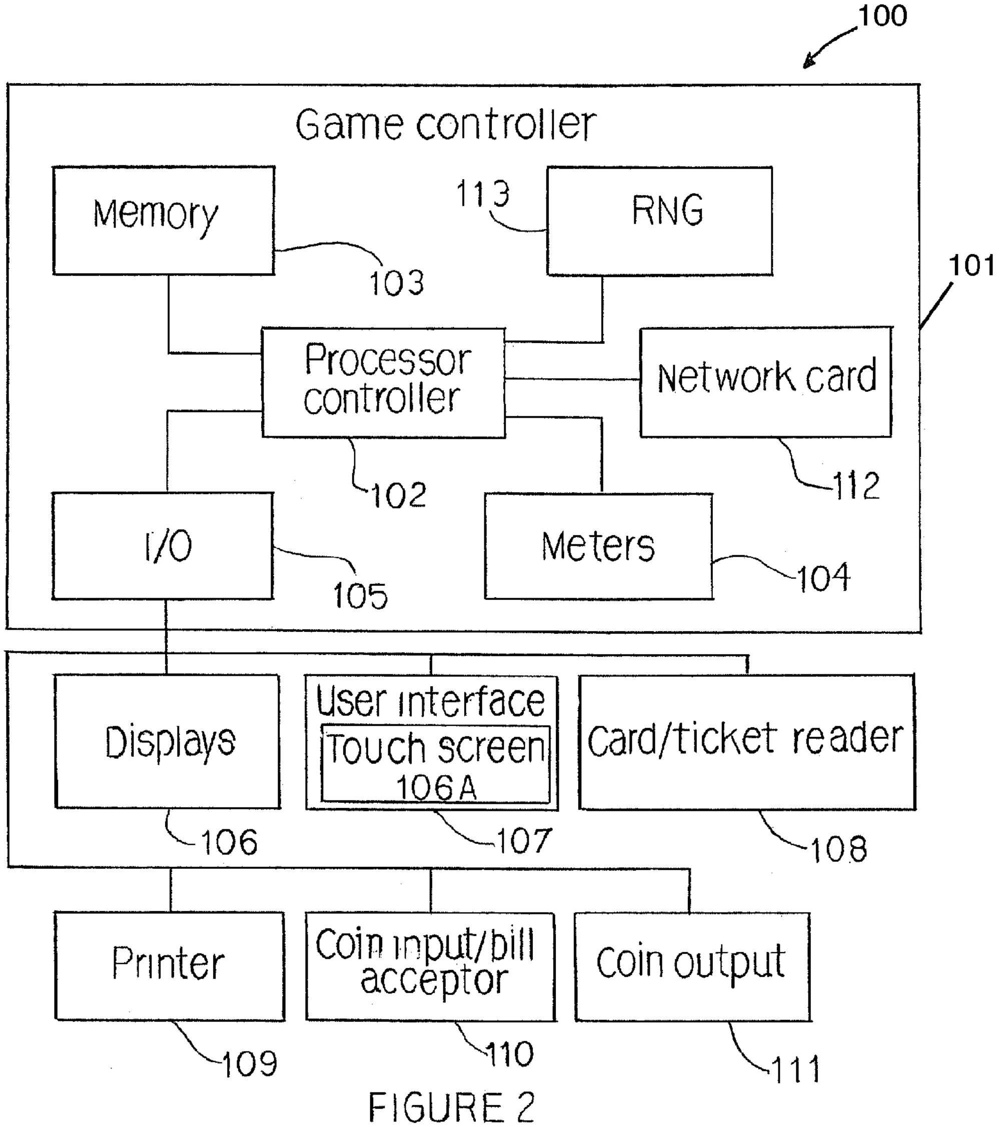
FIG. 2 shows a block diagram of gaming apparatus suitable for implementing the present invention.

FIG. 2 shows a block diagram of a gaming apparatus, generally referenced by arrow 100, suitable for implementing the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms a part of, the computational device 102. Typically, the gaming apparatus 100 will include both volatile and non-volatile memory and more than one of each type of memory, with such memories being collectively represented by the memory 103. The instructions to cause the game controller 101 to implement the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user input devices 107 (e.g. buttons or a touch screen), a card and/or ticket reader 108, a printer 109, a bill acceptor and/or coin input mechanism 110 and a coin output mechanism 111. One or more of the displays 106 may include a touch screen 106A, forming part of the user input devices 107. Additional devices may be included as part of the gaming machine 100, or devices omitted as required for the specific implementation.

In addition, the gaming machine 100 may include a communications interface, for example a network card 112. The network card, may for example, send status information, accounting information or other information to a central controller, server or database and receive data or commands from the central controller, server or database. One or more of the peripheral devices, for example the card/ticket reader 108 may be able to communicate directly with the network card 112.

The game controller 101 may also include a random number generator 113, which generates a series of random numbers that determine the outcome of a series of random game events played as part of a game on the gaming apparatus 100. As explained in more detail in relation to FIG. 4, the computational device 102 may include two or more controllers or processors, which may be local or remote from each other and the displays 106. It will be appreciated that the random number generator may generate pseudo-random or true-random numbers depending on how it is configured.

Figure 3:
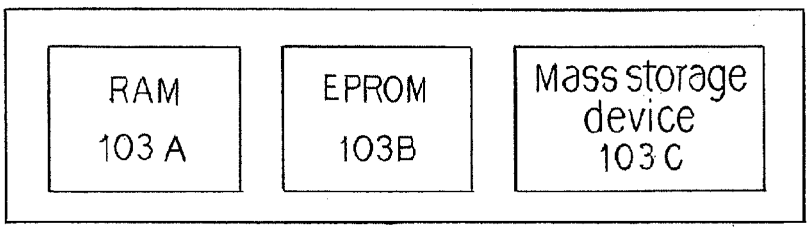
FIG. 3 shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

While the foregoing description has been provided by way of example of the embodiments of the present invention as presently contemplated, which utilize gaming apparatus and machines, those skilled in the relevant arts will appreciate that the present invention also may have application to internet gaming and/or have application to gaming over a telecommunications network, where handsets are used to display game outcomes and receive player inputs. Herein any device operable by a player to play a game such as the above described apparatus and machine is generically referred to as a gaming device.

Figure 4:
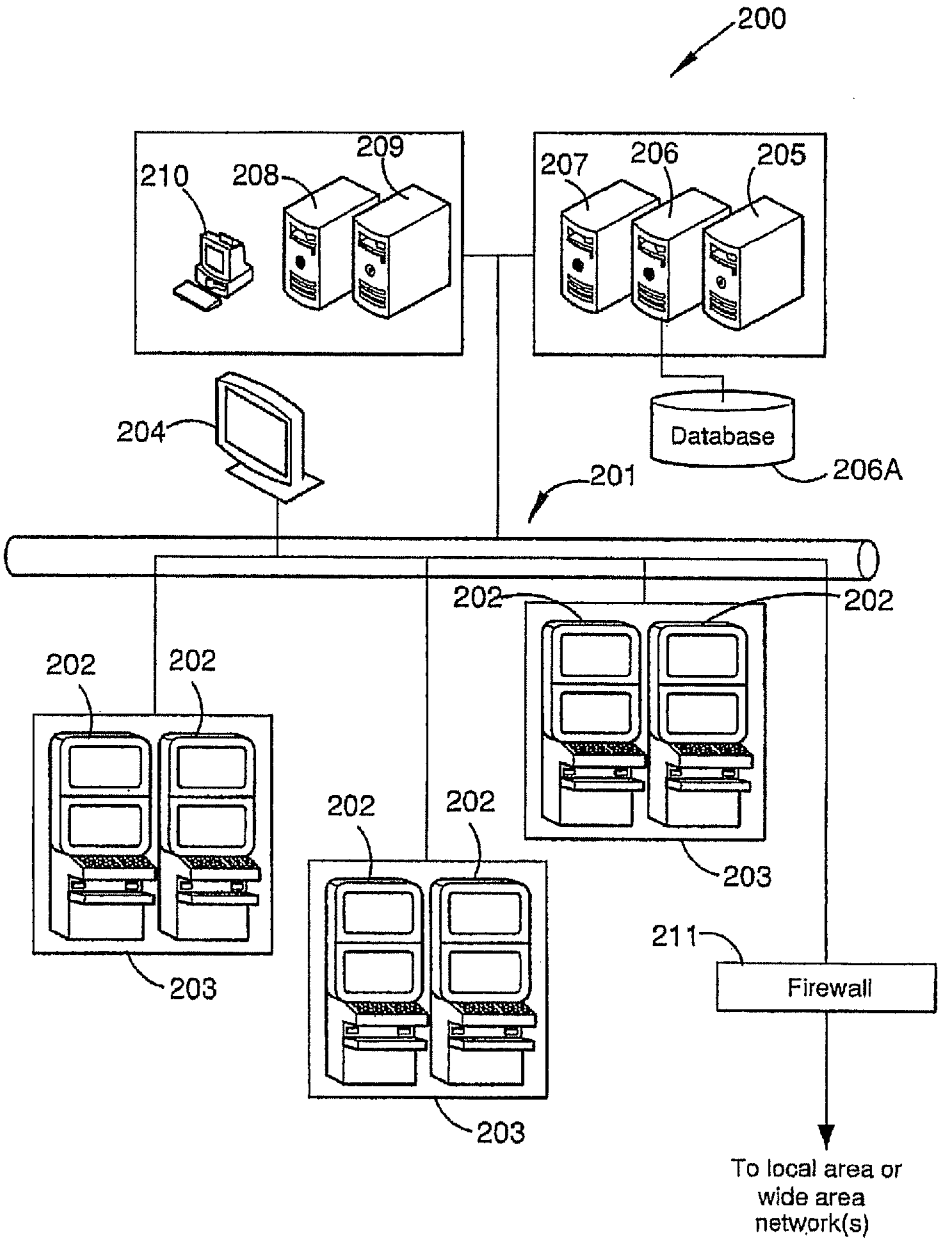
FIG. 4 shows diagrammatically, a network gaming system suitable for implementing the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

Figure 5A:
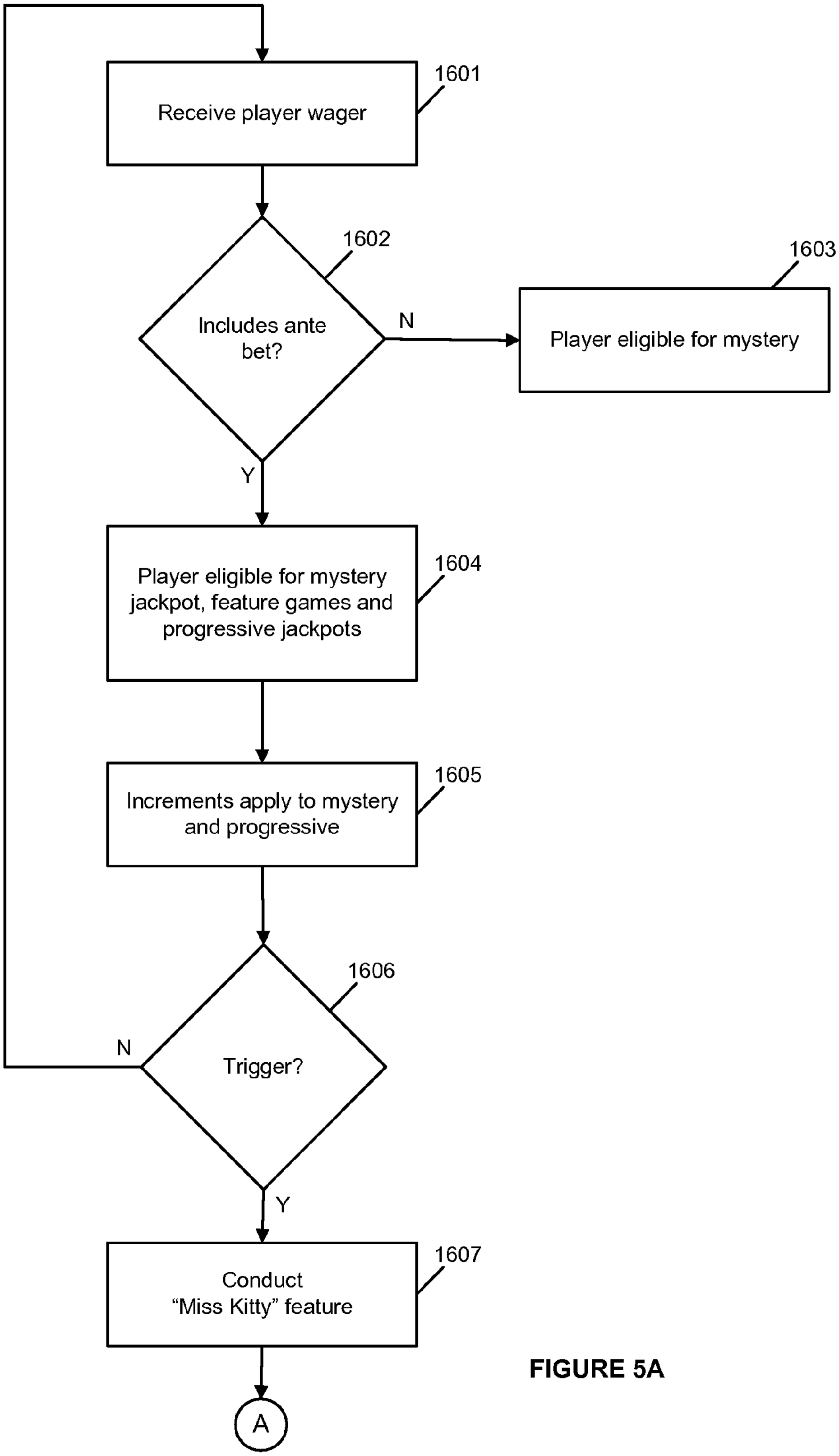
FIGS. 5A and 5B show a flowchart of a game process in accordance with a further embodiment of the present invention.
Figure 5B:
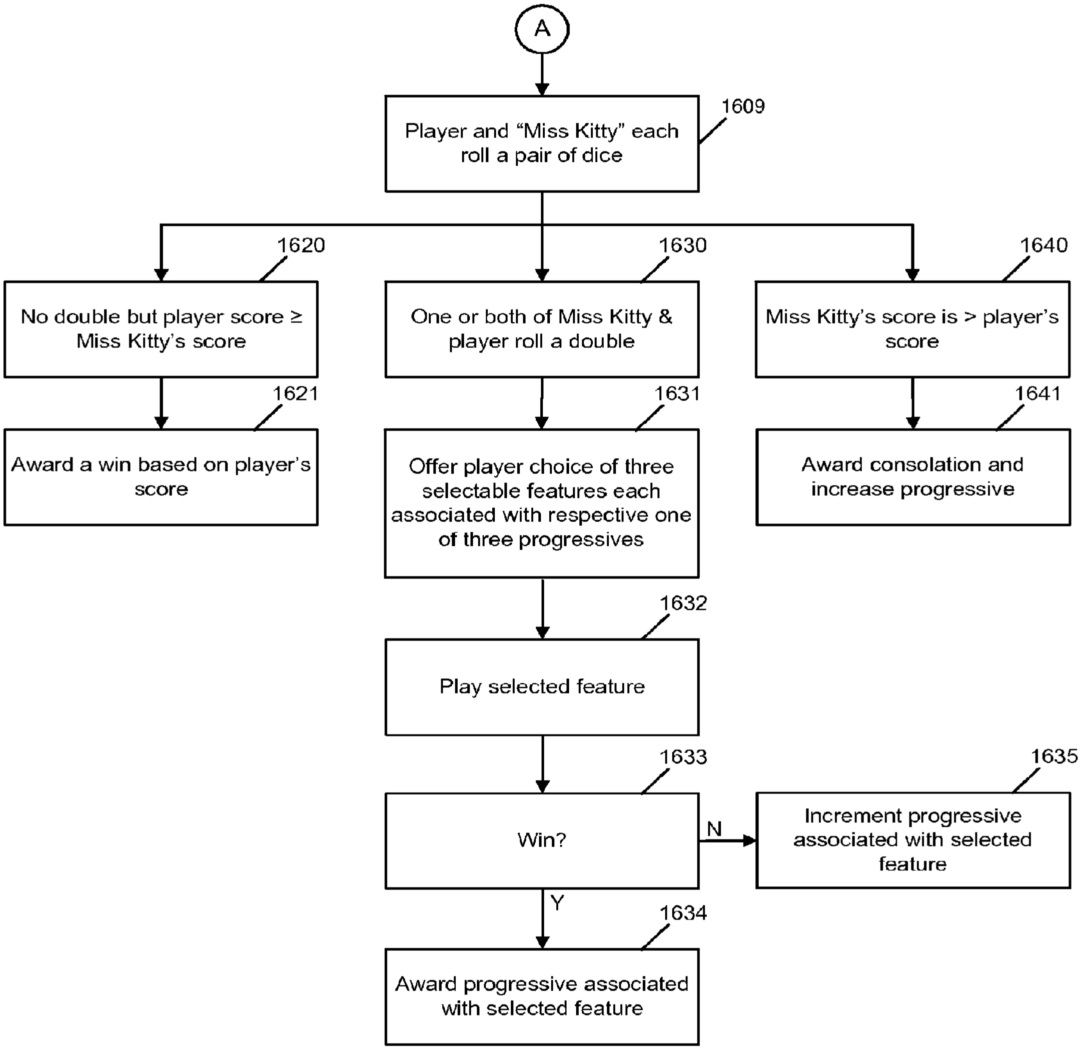
Figure 6:
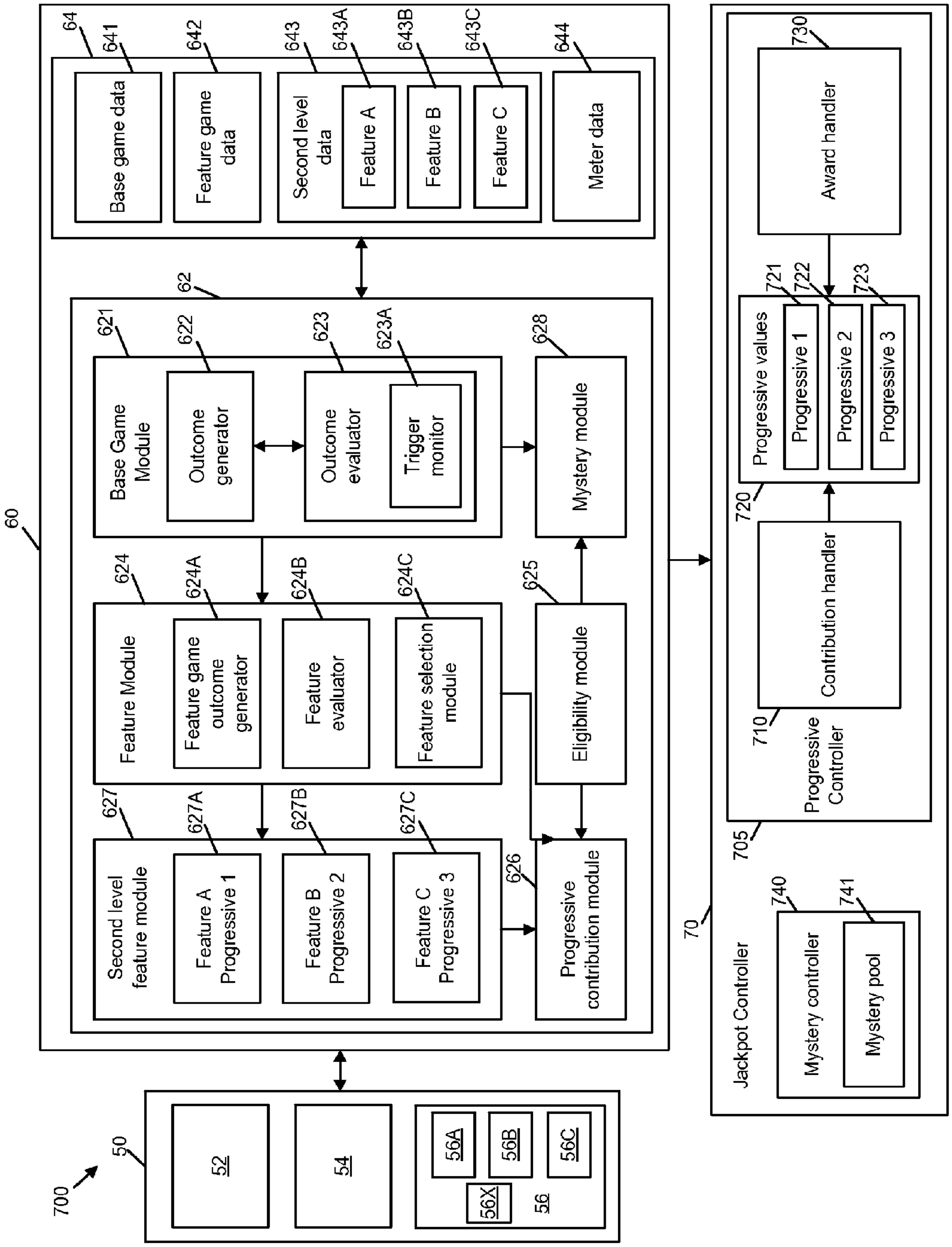
FIG. 6 shows a functional block diagram of an embodiment.

An embodiment, which includes the feature of incrementing the progressive prize by a fixed amount upon the progressive prize not being awarded is illustrated in FIGS. 5A, 5B and FIG. 6. The embodiment describes an arrangement, where the method of gaming involves conducting a base game. The player can wager on the base game in a conventional manner. The base game may be, for example, a spinning reel game. In the alternative, the player may also place an additional ante bet when initiating a play of the base game. The ante bet provides eligibility for a first level feature game, exemplified below as the "Miss Kitty" feature from which the player can access three second level features as described in further detail below. The three second level features can each result in the award of a different progressive prize. The prize pools for the respective progressive jackpots are only incremented when the ante bet is made. The progressive prize pools are incremented in a number of ways as described below but notably, including increments of the respective prize pool by a fixed amount when a second level feature game is lost. In addition to the progressive jackpot prize, a mystery jackpot is provided which can be won irrespective of whether an ante bet is made.

Referring to FIG. 5A, the method of the embodiment involves receiving 1601 a player wager. It is determined 1602 whether the wager includes an ante-bet. If the player does not place the ante-bet, the player is not eligible for the Miss Kitty and second level features games but is still eligible 1603 for the mystery jackpot and accordingly the mystery jackpot pool is increased based on a percentage of the amount bet by the player. As in conventional mystery jackpots, the prize pool can include a seed pool such that when a mystery jackpot is awarded the mystery jackpot can start from a non zero number.

If the bet includes the ante-bet then the player is eligible 1604 for the mystery jackpot, the feature game, and the second level feature games including the progressive jackpots. Accordingly increments apply to both the mystery and progressive jackpots 1605 and there will be increments provided during the base game to both the mystery and progressive jackpot pool. It is determined at the end of each play of the base game whether a trigger condition has been met 1606 in respect of this play of the base game. If no trigger occurs, the process proceeds to the start and awaits the receipt 1601 of a player wager.

If a trigger condition occurs then the first level, Miss Kitty, feature game is started 1607. Referring now to FIG. 5B, in this example of a second level feature game, the player and "Miss Kitty" who is an animated fanciful cat each roll a pair of dice 1609. If the player's total equals or exceeds Miss Kitty's total 1620 the player is awarded 1621 bonus credits or some other award which is typically based on the player's score. For example a multiplier of the number of spots shown on the player's dice.

If either the player or Miss Kitty role a double 1630, the player is awarded bonus credits and may select to play any of three feature games as will be described in further detail below. Persons skilled in the art will appreciate that the number of feature games can vary and is advantageously a plurality of games with the upper limit of games corresponding to a desired number of progressives to be provided by the game. The third alternative 1640 is Miss Kitty's score is greater than the player's score. If this is the case a consolation prize, for example between 150 and 500 credits is awarded, and the progressive jackpot levels are incremented by set amounts of credits. That is each of the three progressive levels is incremented separately by fixed amounts. The amount that each jackpot is incremented may be the same or different. The increment is typically determined and applied at a progressive controller in data communication with a gaming device on which the game is played. However, persons skilled in the art will appreciate that progressives could only obtain contributions from one gaming machine be monitored at the gaming device. Further, there are two possible modes of operation, one where the gaming device simply indicates to a controller that there is a need to make an increment and the progressive controller applies the increment and another where the gaming device determines the progressive amount and communicates it to the progressive controller.

Returning now to FIG. 5B, the player is offered a choice 1631 of three selectable features each of which is associated with a respective one of three progressive jackpots. Typically, the size of the jackpots are different and are commensurate with the probability of winning a jackpot by play of the selected feature such that the player has a higher probability of obtaining award of a jackpot if they choose a lower value progressive jackpot, for example in the range of $100.00 to $200.00 than they have if they choose a game having an associated higher value jackpot, for example in the range of $2,000 to $4,000. Once the player selects the feature, the selected feature is played 1632 and it is then determined whether the player wins 1633. If the player loses then the game involves incrementing the relevant progressive associated with the selected feature by a fixed amount 1635. In the alternative if the player wins then they are awarded the progressive jackpot associated with the selected feature 1634. The progressive jackpot pools may incorporate hidden seed pools in a manner known in the art to enable them to start from non-zero amounts.

In one example, the three features may be as follows: 1) a "granny" feature where the player has five shots determined by random trials to hit bottles displayed on a fence post. A person skilled in the art will appreciate that the reference to "random" above includes pseudo random. Accordingly, the gaming device determines by random number generator 113 how many bottles the player hits. The gaming device also determines whether an animated character named "granny" hits the bottles, and if the player's score equals or exceeds granny's score, the granny level progressive jackpot is awarded. Alternatively, if granny's score exceeds the player's score, the granny level progressive jackpot value is incremented by a set amount. Persons skilled in the art will appreciate that the odds of the player and granny hitting bottles could be 50/50 for each bottle or weighted in some fashion such that the player and granny need not necessarily have the same odds of hitting a bottle.

The second feature is a "bandito" feature where twelve windows are presented on the screen and the banditos hidden behind one of the twelve windows. The player gets four hits to try and find the bandito. If the player finds the bandito, the player wins the bandito jackpot level value. If the player does not find the bandito, the bandito jackpot level is incremented by a set amount.

The third feature is the "gambler" feature. The gambler is dealt two aces. The player is dealt five cards. If the player's poker hand beats two aces, the gambler progressive jackpot level is awarded. If the player's hand does not beat the pair of aces, the gambler jackpot level is incremented by a set amount.

FIG. 6 is a functional block diagram of a gaming system 1700 of a exemplary embodiment for implementing the method of FIG. 5. FIG. 6 shows a gaming system 1700 having a gaming device 700 and a jackpot controller 70. Persons skilled in the art will appreciate that in practice a plurality of gaming devices will be connected to the same jackpot controller in order to provide for substantial value jackpot pools as is shown in FIG. 4 where a plurality of gaming. However, a single gaming device 700 is shown in FIG. 6 for ease of exposition. It will be appreciated that herein it is assumed that each gaming device is eligible for at least one jackpot prize (provided it is being played). In other embodiments, eligibility criteria may be applied. For example, that the gaming device is in a particular part of a venue, offers a designated game, the wager is of a certain level, or the player has inserted a player tracking card.

Persons skilled in the art will appreciate that the connection between the gaming device and the jackpot controller 70 can be a conventional network connection such as an Ethernet. Persons skilled in the art will also appreciate that the game device 700 can be exemplified in the form of a gaming machine 10, 100 as described in relation to FIGS. 1 and 2 but as indicated elsewhere in the specification, the player interface which the player plays and the game controller need not necessarily be co-located.

Turning now to FIG. 6 the gaming device 700 has a player interface 50 in data communication with a game controller 60. The player interface includes a credit input mechanism 52, a display 54 and a game play mechanism 56. The game play mechanism includes a number of buttons and/or a touch screen to enable the player to interact with the game controller 60. For ease of exposition, a subset of these is shown including an ante-bet button 56X and feature selection buttons 56A, 56B and 56C.

In the embodiment, a series of modules are implemented by a processor 62 executing program code stored in memory 64 such that the game controller is configured to carry out the functions described below. Persons skilled in the art will appreciate that these modules could be provided in different ways, including by providing dedicated circuits configured to carry out the functions described below. Further, persons skilled in the art will appreciate that there will be other modules, for example a random number generator and a display controller for controlling the display and that these are omitted for the sake of clarity. The game controller 60 includes a base game module 621 which is arranged to carry out a base game each time the player operates input mechanism to place a wager. The game controller 60 also includes an eligibility module 625 which determines whether than ante-bet has been placed with ante-bet button 56X. When an ante-bet is placed the eligibility module activates progressive contribution module 626 which sends for each play of the game data to the jackpot controller to indicate that its progressive controller 705 should increment the progressive value 721 to 723 which are stored in progressive value database 720. To this end the progressive controller 705 includes a contribution handler 710 which knows the proportional amounts which each of the progressives 721, 722, 723 should be incremented each time there is a play of the game. In addition the eligibility module actives the trigger monitor 623A of the outcome evaluator 623 which is arranged to evaluate the outcomes based on base game data 641.

It will be appreciated there is also a mystery module 628 which operates irrespective of whether the ante-bet has been placed in order to send contributions based on a percentage of turnover to the mystery controller of the jackpot controller. The mystery controller 740 increments the mystery pool 741 accordingly.

The base game data 641 also allows the outcome generator 622 to generate the outcomes which as described above may be, for example, those of a spinning reel game. When the trigger monitor 623A determines that a trigger condition is met, for example, the occurrence of three designated scattered symbols at display positions of the virtual reels of a video spinning reel game, the trigger monitor 623A activates the second level feature module 624. The feature module 624 includes a feature game outcome generator 624A which, in the example given implements the dice game of the Miss Kitty game which generates outcomes based on the feature game data 642 which in turn are evaluated by the feature evaluator 624B based on feature game data 624 which specifies the rules of the Miss Kitty game as described above. The feature module 624 also includes a feature selection module to enable a player to select the feature by operating buttons 56A, 56B, 56C to select one the features described above when the player wins eligibility to the feature. As described above, the feature module 624 is arranged such as to communicate when a loss of the feature game occurs or that the first level features to the contribution handler 710 of the progressive controller 705 so that it can increment the progressive 721, 722, 723 in the manner described above.

When the player wins the first level feature, the feature selection module 624C enables the player to select one of feature A, feature B, or feature C 627A, 627B, 627C; these features being associated respectively with a first progressive 721, a second progressive 722 and a third progressive 723. Persons skilled in the art will appreciate that while these features are all shown as being implemented by a second level feature module 627 they could equally be provided as separate modules which are instantiated as required based on the second level data 643 which specifies each of features A, B and C 643A, 643B, 643C and the rules associated with those games. As described above if the player loses any of these features, the progressive that is specifically associated with it is incremented. That is, for example, if feature A 627A is lost by the player then the player's losing amount which is fixed is added the progressive. Thus, giving the impression that the player has lost to the animated character that forms part of the feature as described above. At the end of play or at appropriate points during play the meter data 644 is updated to reflect the outcomes of play the amount wager, any amounts won, etc. This is viewable by player on display 54. Persons skilled in the art will appreciate that if the player wins one of the second level features then the award handler 730 awards the progressive to the player. The award handler 730 can function in the same way as typical progressive machines such as to arbitrate when two gaming machines claim a progressive in close proximity which of those is to be awarded the first progressive and which is to be awarded the second progressive.

Persons skilled in the art will appreciate that other arrangements are possible. For example, rather than the second level feature module 627 being implemented within the game controller is could be implemented elsewhere, for example within the jackpot controller. Further, while the mystery and progressive jackpot controllers 740, 705 are shown within a single jackpot controller 70 and this is advantageous in terms of reducing equipment, it is not strictly necessary and they can be provided as separate controllers.

Persons skilled in the art will appreciate that an example of an exemplary trigger of the Miss Kitty feature game could be a so-called "hyperlink" trigger which is based on an amount that is bet by the player. That is, the amount bet gives the person a certain chance of the feature game being triggered.

While the foregoing description has been provided by way of example of the embodiments of the present invention as presently contemplated, which utilize gaming apparatus and machines, those skilled in the relevant arts will appreciate that the present invention also may have application to internet gaming and/or have application to gaming over a telecommunications network, where handsets are used to display game outcomes and receive player inputs. Herein any device operable by a player to play a game such as the above described apparatus and machine is generically referred to as a gaming device.

Further aspects of the method will be apparent from the above description of the gaming system. Persons skilled in the art will also appreciate that the method could be embodied in program code. The program code could be supplied in a number of ways, for example on a computer readable medium, such as a disc or a memory (for example, that could replace part of memory 103) or as a data signal (for example, by downloading it from a server).

It will be understood that the invention disclosed and defined in this specification extends to all alternative combinations of two or more of the individual features mentioned or evident from the text or drawings. All of these different combinations constitute various alternative aspects of the invention.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming, comprising:

conducting a mystery jackpot and a progressive jackpot having, respectively, a mystery jackpot pool and a progressive jackpot pool to which contributions are made in response to game play on participating gaming devices in which plays of respective games of the gaming devices are conducted in response to receipt of a bet and optionally an additional ante bet;

making a contribution to the mystery jackpot pool in response to all plays of respective games of the participating gaming devices;

making at least one contribution to the progressive jackpot pool only in response to plays of respective games of the participating gaming devices in which an ante bet is made on the respective games;

determining in each of the plays of the respective games whether to award a feature game;

in response to a determination to award a feature game, determining during play of the feature game whether to award one of a plurality of second level feature games, each second level feature game being associated with an individual jackpot prize funded by the progressive jackpot pool, wherein the respective values of the individual jackpot prizes are different and the probabilities of winning one of the individual jackpot prizes are commensurate with the respective values of the individual jackpots; and awarding the individual jackpot prize from the progressive pool upon occurrence of respective ones of winning game outcomes of the plurality of second level feature games.

2. A method as claimed in claim 1, comprising making more than one contribution to the progressive jackpot pool in response to at least one game outcome during play of a game with ante bet.

3. A method as claimed in claim 2, wherein there are a plurality of sub-pools of the progressive jackpot pool, and the method comprises making at least one contribution to each sub-pool.

4. A method as claimed in claim 3, comprising making a contribution to a specific sub-pool in response to the at least one game outcome.

5. A method as claimed in claim 1, comprising predefining the participating gaming devices.

6. A method as claimed in claim 1, comprising determining the participating gaming devices in accordance with at least one criteria.

7. A method as claimed in claim 6, wherein at least one criteria is that a gaming devices offers a designated game.

8. A method as claimed in claim 1, comprising determining for each play of a game whether to award the mystery jackpot.

9. A method as claimed in claim 1, further comprising determining in each of the plays of the respective games in which an ante bet is made whether to award a prize from the progressive pool.

10. A method as claimed in claim 9, wherein said determining whether to award a prize from the progressive pool includes said determining whether to award a feature game.

11. A game controller for a gaming device, the game controller comprising:

a computational device; and memory arranged to store instructions executed by the computational device;

wherein the computational device is arranged to:

enable a player to participate in a mystery jackpot and a progressive jackpot having, respectively, a mystery jackpot pool and a progressive jackpot pool;

receive an instruction initiating play of a game;

receive an indication of a wager on the play of the game, the wager including a bet and optionally an additional ante bet;

cause a contribution to the mystery jackpot pool in response to each play of the game;

cause at least one contribution to the progressive jackpot pool only in response to each play of the game in which the ante bet is made on the game;

determine in each play of the game whether to award a feature game;

in response to a determination to award a feature game, determine during play of the feature game whether to award one of a plurality of second level feature games, each second level feature game being associated with an individual jackpot prize funded by the progressive jackpot pool, wherein the respective values of the individual jackpot prizes are different and the probabilities of winning one of the individual jackpot prizes are commensurate with the respective values of the individual jackpots; and award the individual jackpot prize from the progressive pool upon occurrence of respective ones of winning game outcomes of the plurality of second level feature games.

12. A game controller as claimed in claim 11, arranged to cause more than one contribution to the progressive jackpot pool in response to at least one game outcome during play of a game with ante bet.

13. A game controller as claimed in claim 12, wherein there are a plurality of sub-pools of the progressive jackpot pool, and the game controller causes at least one contribution to be made to each sub-pool.

14. A game controller as claimed in claim 13, arranged to cause a contribution to be made to a specific sub-pool in response to the at least one game outcome.

15. A game controller as claimed in claim 11, arranged to determine for each play of a game whether to award the mystery jackpot.

16. A game controller as claimed in claim 11, arranged to determine for each play of a game in which an ante bet is made whether to award a prize from the progressive pool.

17. A game controller as claimed in claim 16, arranged to determine whether to award a prize from the progressive pool by determining whether to award a feature game.

18. A game controller as claimed in claim 11, comprising a memory storing program code and a processor arranged to execute the program code to implement the game and cause the contributions to be made.

19. A gaming system, comprising:

at least one jackpot controller arranged to conduct a mystery jackpot and a progressive jackpot having, respectively, a mystery jackpot pool and a progressive jackpot pool; and a plurality of gaming devices in data communication with the at least one jackpot controller, in which plays of respective games of the plurality of gaming devices are conducted in response to receipt of a bet and optionally an additional ante bet;

wherein the at least one jackpot controller is further arranged to:

make a contribution to the mystery jackpot pool in response to all plays of respective games of the plurality of gaming devices, make at least one contribution to the progressive jackpot pool only in response to plays of respective games of the plurality of gaming devices in which an ante bet is made on the respective games;

determine in each play of the game whether to award a feature game;

in response to a determination to award a feature game, determine during play of the feature game whether to award one of a plurality of second level feature games, each second level feature game being associated with an individual jackpot prize funded by the progressive jackpot pool, wherein the respective values of the individual jackpot prizes are different and the probabilities of winning one of the individual jackpot prizes are commensurate with the respective values of the individual jackpots; and award the individual jackpot prize from the progressive pool upon occurrence of respective ones of winning game outcomes of the plurality of second level feature games.

20. A gaming system as claimed in claim 19, wherein the jackpot controller makes more than one contribution to the progressive jackpot pool in response to at least one game outcome during play of a game with ante bet.

21. A gaming system as claimed in claim 20, wherein there are a plurality of sub-pools of the progressive jackpot pool, and the jackpot controller makes at least one contribution to each sub-pool for each play of a game.

22. A gaming system as claimed in claim 21, wherein the jackpot controller makes a contribution to a specific sub-pool in response to the at least one game outcome.

23. A gaming system as claimed in claim 19, wherein each gaming device determines for each play of a game whether to award the mystery jackpot.

24. A gaming system as claimed in claim 19, wherein each gaming device determines for each play of a game in which an ante bet is made whether to award a prize from the progressive pool.

25. A gaming system as claimed in claim 24, wherein determining whether to award a prize from the progressive pool includes determining whether to award a feature game.

26. A gaming system as claimed in claim 25, arranged to determine during the feature game whether to award one of a plurality of second level feature games and awarding the prize from the progressive pool upon the occurrence of respective ones of winning game outcomes of the plurality of second level feature games.

27. A gaming system as claimed in claim 26, wherein each gaming device is arranged to carry out the feature games.

28. A gaming system as claimed in claim 26, comprising a feature controller arranged to carry out at least one of the feature games.

29. A gaming system as claimed in claim 19, comprising separate jackpot controllers for the mystery and progressive jackpots.

30. A computer readable storage medium comprising computer program code stored thereon which when executed results in a gaming system performing the method of claim 1.

* * * * *

UNITED STATES PATENT AND TRADEMARK OFFICE

CERTIFICATE OF CORRECTION

PATENT NO. : 8,562,421 B2
APPLICATION NO. : 12/340682
DATED : October 22, 2013
INVENTOR(S) : Chim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this
Seventh Day of April, 2015

Michelle K. Lee
*Director of the United States Patent and Trademark Office*